United States Patent [19]
Beiswinger et al.

[11] 3,729,691
[45] Apr. 24, 1973

[54] ELECTRO-MECHANICAL OSCILLATOR OF ELECTRODYNAMICAL AND ELECTROMAGNETIC TYPES

[75] Inventors: Wayne J. Beiswinger, Chester; Walter R. Witte, Hampton, both of N.J.

[73] Assignee: Verta-Tronics, Inc., Hampton, N.J.

[22] Filed: June 16, 1972

[21] Appl. No.: 263,438

[52] U.S. Cl..................331/116 M, 310/15, 331/154, 318/128, 318/132, 417/417
[51] Int. Cl..............................................H03b 5/30
[58] Field of Search....................331/116 M, 154; 318/132, 128; 417/417; 310/15

[56] References Cited

UNITED STATES PATENTS 3,355,676   11/1967   Omura et al.....................331/116 M
3,515,966   6/1970    De Valroger et al................318/132

*Primary Examiner*—John Kominski

[57] ABSTRACT

An electrodynamical or electromagnetic oscillator comprising an electric oscillator including three transistors and a mechanical oscillator having an armature coil movable in a magnetic field. The transistors are turned ON in sequence to start current flow in the armature coil which is moved in the magnetic field in one direction to generate in the armature coil a counter voltage of positive polarity. This voltage varies the amount of current flow in the armature coil until the one directional movement of the armature coil is terminated whereat the transistors are turned OFF. Thereafter, the armature coil is moved in the magnetic field in the opposite direction to generate in the armature coil a voltage of negative polarity which voltage holds the transistors turned OFF until the opposite directional movement of the armature coil is terminated. Modifications involve the electric oscillator including one or two transistors

11 Claims, 8 Drawing Figures

Patented April 24, 1973

NPN TRANSISTOR

Patented April 24, 1973

Patented April 24, 1973

PNP TRANSISTOR

ELECTRO-MECHANICAL OSCILLATOR OF ELECTRODYNAMICAL AND ELECTROMAGNETIC TYPES

BACKGROUND OF THE INVENTION

This invention relates to an electro-mechanical oscillator of an electrodynamical or electromagnetic type including an armature coil moving in opposite directions in a magnetic field provided in a mechanical oscillator and three transistors in an electric oscillator, and more specifically to such oscillator in which the transistors are turned ON in sequence until the armatire coil movement in one direction is terminated whereat the transistors are turned OFF and held turned OFF until the armature coil movement in the opposite direction is terminated, whereby the transistor turning ON and OFF is synchronized with the one and opposite directional movements, respectively, of the armature coil.

The prior art is aware of an electrodynamical oscillator including two electric coils moving in a magnetic field in a mechanical oscillator and two symmetrically connected transistors in the electric oscillator wherein the transistors are alternately driven from saturation to cut off by voltage induced in the moving coils to generate alternating current causing the moving coils to oscillate. This current is synchronized with the natural frequency of the mechanical oscillator. When the electrodynamical oscillator embodies two resonant springs on which the two coils are mounted, three external electric terminals are required. However, when a single resonant spring is utilized to mount the two coils, then two external terminals together with one internal third connection are employed. One or more of these terminals is frequently broken by mechanical vibration occasioned by the compression and expansion of the two or one resonant springs, thereby rendering the electro-mechanical oscillator inoperative.

The present invention is concerned with the provision of one electric coil and one external terminal therefor in an electro-mechanical oscillator to minimize the possibility of a malfunction therein due to a broken terminal, thereby increasing performance reliability and decreasing manufacturing cost of the oscillator.

It is a principal object of the invention to improve the reliability of operation of an electro-mechanical oscillator.

It is another object to minimize the need for repairs in an electro-mechanical oscillator.

It is an additional object to simplify the structure of an electro-mechanical oscillator.

It is a further object to reduce the cost of manufacture of an electro-mechanical oscillator.

SUMMARY OF THE INVENTION

In association with a housing and a mechanical oscillator positioned interiorly of the housing and including two resonant springs alternately expansible and compressible with a natural frequency of oscillation, and an armature coil mounted between the two springs in a magnetic field, a specific embodiment of the present invention comprises a single armature coil having two terminals of which one is ground inside the housing and the other extending from the inside of the housing and attached to an outside surface of the housing, and an electric oscillator including a source of direct voltage having positive and ground terminals, three transistors, each having a collector, an emitter and a base; the transistors being normally turned OFF. A first transistor has its collector connected to the source positive terminal, its emitter to the other terminal of the armature coil; a second transistor has its base connected to the source positive terminal and its emitter to the armature coil one terminal and the voltage source ground terminal; and a third transistor has its base connected to the collector of the second transistor, its emitter to the source positive terminal, and its collector to the base of the first transistor. A series capacitor-resistor network couples a common point of the first transistor emitter and the armature coil other terminal to the second transistor base.

In the operation of the specific embodiment of the invention, the source positive voltage applied to the second transistor base turns ON the second transistor which thereupon turns ON the third and first transistors in sequence. This causes current to flow in a series circuit including the voltage source positive terminal, the collector-emitter junction of the first transistor, the armature coil, the voltage source ground terminal and the voltage source, whereby substantially the entire source voltage is applied across the armature coil. The series capacitor-resistor network applies positive voltage from the common point of the first transistor collector-emitter junction and the armature coil other terminal to the second transistor base to hold the second, third and first transistors turned ON.

As the armature coil having current flowing therein is located in a magnetic field provided by a permanent magnet and two pole pieces, the source voltage applied to the armature coil serves to expand one spring and compress the other thereby moving the armature coil in one direction in the magnetic field. As the armature coil is thus moved in the one direction, a counter electromotive force of positive polarity generated therein varies the amount of current flow in the armature coil until equilibrium is established between the magnitude of a generated electromagnetic force and the inherent force of the two springs to terminate the one directional movement of the armature coil. This occurs when equal and opposing effects are established between the generated electromagnetic force and the two springs for the one direction of movement of the armature coil. At this time, the second, third and first transistors are turned OFF.

Now, the compressed other spring and the expanded one spring move the armature coil in the magnetic field in a direction opposite to the one direction whereupon a counter electromotive force of negative polarity is generated in the oppositely moving armature coil due to a discharge of electrical energy inductively stored in the coil and the armature coil opposite directional movement. This electromotive force of negative polarity applied via the series capacitor-resistor network to the second transistor base reverse biases the second transistor thereby holding the second transistor as well as the third and first transistors turned OFF. Obviously, as the first, second and third transistors are turned OFF, no current flows in the moving armature coil. The opposite directional movement of the armature coil is continued until equilibrium is again established between the magnitude of a generated electromagnetic force and the inherent force of the two springs, whereupon the opposite directional movement of the armature coil is terminated. This completes one cycle of the operation of the mechanical and electrical oscillator. Each of the next succeeding operating cycles of the mechanical and electrical oscillators takes place in a similar manner. It is thus seen that the ON and OFF states of the transistors in the electric oscillator occur at a frequency rate synchronized with the natural frequency of oscillation of the mechanical oscillator, i.e., the respective one and opposite directional movements of the armature coil.

A second embodiment of the invention utilizes two transistors functioning in a manner similar to that of the three transistor embodiment as previously described. Third and fourth embodiments employ a single transistor and include a transformer coupled to the single transistor and the moving armature coil to replace the series capacitor-resistor coupling network of the first and second embodiments. The transformer functions as a regenerative gain stage.

An advantageous feature of each of the four embodiments of the invention resides in the use of a single armature coil and only one terminal of the armature coil extending from the interior of the housing to the exterior thereof for attachment to the external surface of the housing, whereby the operation of the overall electro-oscillator is improved, repairs minimized and the internal structure simplified. This electro-oscillator is advantageously used with a piston type compressor in a refrigerator of a small size, particularly one designed with small physical dimensions and weight for hand portability.

An electro-mechanical oscillator as used herein is understood to designate either an electrodynamical or an electromagnetic type as hereinafter described.

BRIEF DESCRIPTION OF THE DRAWING

The invention is readily understood from the following description taken together with the accompanying drawing in which.

DETAILED DESCRIPTION OF ONE EMBODIMENT OF THE INVENTION

Figure 1:
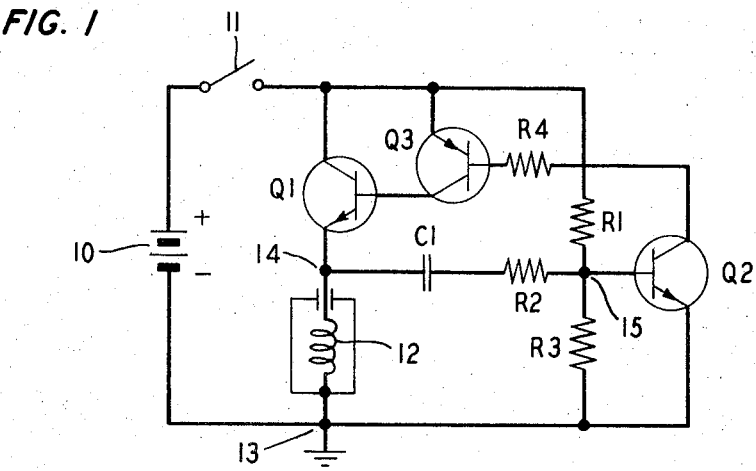
FIG. 1 is a schematic diagram of an electro-mechanical oscillator including a specific embodiment of the invention.

FIG. 1 shows a direct voltage source 10 having positive and ground terminals and connectible in or out of circuit via a normally open single pole single throw switch 11, and a plurality of transistors Q1, Q2 and Q3, each including a collector, an emitter and a base. Transistor Q1 has its collector connected to a positive terminal of the switch, its emitter to one end of an armature coil 12 whose opposite end is connected to ground 13 and whose physical location and function are hereinafter explained. It is thus apparent that the switch is usable in a closed condition to connect the collector-emitter junction of transistor Q1, the armature coil, and voltage source in a series circuit identified subsequently for a purpose later explained.

A second transistor Q2 has its base connected via resistor R1 to the same switch terminal to which the collector of transistor Q1 is joined and its emitter to ground 13 common to the voltage source and the armature coil opposite end. A third transistor Q3 has its base connected through resistor R4 to the collector of the second transistor Q2, its emitter to the same switch terminal to which the collector and base of transistors Q1 and Q2, respectively, are connected, and its collector to the base of transistor Q1. A resistor R3 shunts the base-emitter junction of transistor Q2. It is thus seen in FIG. 1 that transistors Q1 and Q2 are an NPN type while transistor Q3 is a PNP type and further that transistors Q1 and Q3 constitute effectively a PNP power transistor.

A series capacitor-resistor network including capacitor C1 and resistor R2 couple a common point 14 of the emitter of transistor Q1 and the armature coil one end to the base of transistor Q2, and thereby to a junction point 15 of resistors R1 and R3 for a purpose later mentioned.

Figure 5:
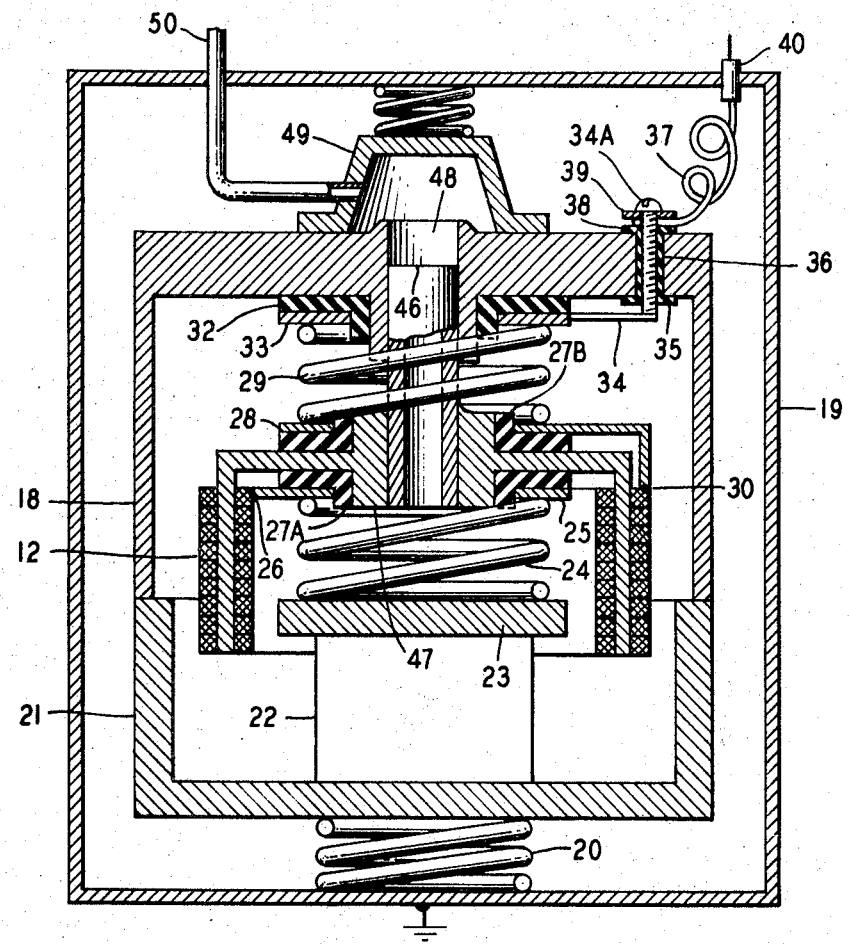
FIG. 5 is a cross section of a refrigerant compressor embodying an electrodynamical oscillator usable with the invention in each of FIGS. 1, 2, 3 and 7.

FIG. 5 discloses the armature coil 12 of FIG. 1 embodied in a compressor of a refrigerant in a hand portable refrigerator, not shown, and including the following additional components of the electrodynamical oscillator. Housing 19 interiorly contains a first coiled spring 20 positioned on an internal surface of its bottom to support a unitary structure consisting of a hollow yoke 21 in which a permanent magnet 22 and a pole piece 23 are mounted. A second coiled spring 24 disposed on an uppermost surface of the pole piece 23 supports on an upper surface a first conductive member 25 which is electrically connected to the grounded opposite end of the armature coil 12 at point 26. An insulator 27a electrically insulates the member 25 from a support 47 on which the armature coil is mounted. An insulator 27b electrically insulates a second conductive member 28 which is electrically connected at point 30 to the one end of armature coil 12 and which supports a third coiled spring 29. Points 26 and 30 in FIG. 5 correspond to points 13 and 14, respectively, in FIG. 1.

An inverted hollow cylinder 18 disposed on the uppermost surface of the yoke 21 includes an insulating element 32 supporting a conductive member 33 which engages the uppermost end of a third coiled spring 29. A conductive lead 34 connects the member 33 to a conductive rivet 34a at one end adjacent to an insulating disk 35. This rivet is positioned interiorly of an electric insulating tube 36 extending through one end of the cylinder 18 and terminating exteriorly thereof. An electric lead 37 has one end joined to the rivet at a point between insulating disk 38 and a washer 39 rigidly attached to the opposite end of the rivet. The opposite end of the lead 37 is extended via a hermetically sealed connector 40 mounted in the housing from the interior of the housing to the exterior thereof for connection to the emitter of first transistor Q1 at the common point 14 in FIG. 1. It is noted that lead 37 contains several convolutions to compensate for oscillations of the armature coil as hereinafter mentioned.

It is thus seen that FIGS. 1 and 5 provide a series circuit including in FIG. 1 the positive terminal of voltage source 10, switch 11 when closed, the collector-emitter junction of transistor Q1 and common point 14, and in FIG. 5 common point 14, connector 40, lead 37, rivet 34a, lead 34, member 33, spring 29, member 28, connection point 30, armature coil 12, connection point 26, member 25, spring 24, pole piece 23, magnet 22, yoke 21, spring 20, housing 19 and ground 13 which is also included in FIG. 1. This series circuit serves a purpose which is hereinafter explained. It is noted that the armature coil is obviously an air-core type.

A piston 46 has one end suitably welded to the member 47 and a free opposite end projecting into a cylindrical opening 48 formed in the cylinder 18 and having an air-tight cylinder head 49 positioned above the latter opening. A conduit 50 has one end hermetically mounted in the cylinder head 49 and an opposite end extending exteriorly of the housing and connected to a refrigerant reservoir, not shown, for a purpose that is known in the art. It is understood that a suitable valve, not shown, is associated with the piston for compressing a refrigerant in a manner known to the art. It is thus seen in FIG. 5 that the armature coil positioned in radial magnetic flux produced by yoke 21, permanent magnet 22, pole piece 23 is reciprocated to impart corresponding reciprocation to the piston 46 in a manner and for a purpose that are presently described. As the description of the foregoing structure and operation of FIG. 5 is brief, further understanding thereof may be had by reference to U.S. Pat. No. 3,355,676 issued Nov. 28, 1967 and U.S. Pat. No. 2,853,229 issued Sept. 23, 1958.

OPERATION OF THE ONE EMBODIMENT OF THE INVENTION IN FIGS. 1 and 5

Let it be assumed the structures in FIGS. 1 and 5 indicate a condition therein when the switch 11 is open and a state of rest exists between the armature coil and the springs 24 and 29.

When the switch 11 is closed, direct current is caused to flow in a circuit including positive terminal of the voltage source, resistor R1, base-emitter junction of the second transistor Q2, and ground 13, whereby the second transistor Q2 is turned ON. This current flow effective via current limiting resistor R4 causes the third transistor Q3 to turn ON whereupon current flow therein activates the first transistor Q1 to turn ON. Now, the entire voltage of source 10 minus the voltage drop in the first transistor Q1 is applied to the armature coil. The voltage at the common point 14 is applied via the series network of capacitor C1 and resistor R2 to the base of the second transistor Q2 which is thereby held turned On to continue the third and first transistors Q3 and Q1, respectively, turned ON.

Figure 4:
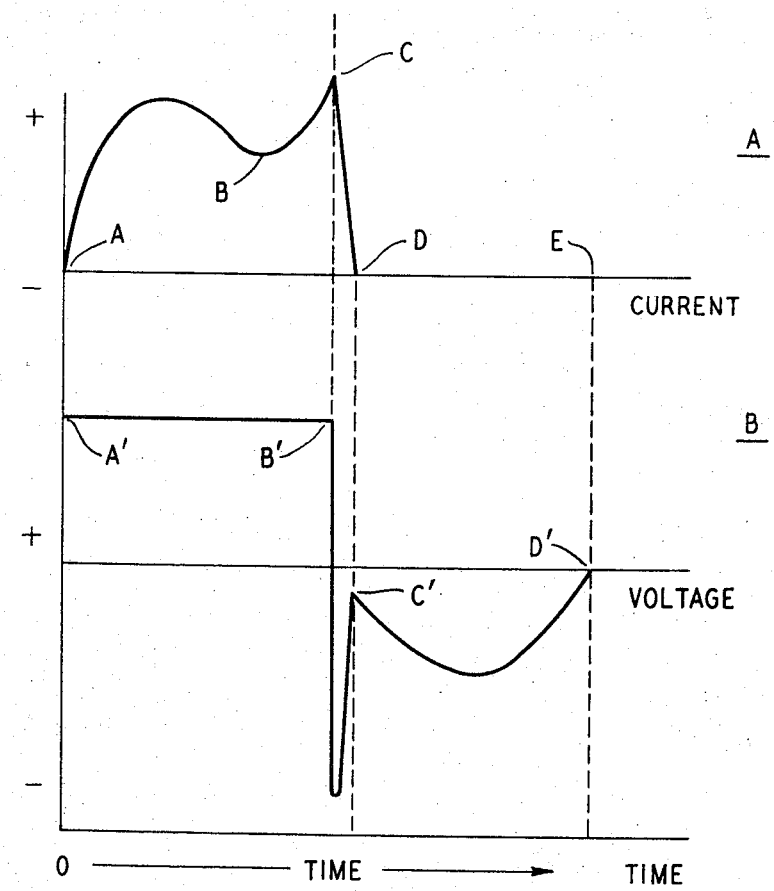
FIGS. 4A and B are curves illustrating electric action obtainable in FIGS. 1, 2, 3 and 7.

When the voltage of source 10 is applied to the armature coil, current is caused to flow therein in the series circuit in FIGS. 1 and 5 including the positive terminal of source 10, closed switch 11, collector-emitter junction of first transistor Q1, the armature coil, and ground 13 as previously described. This current energizes the armature coil disposed in the magnetic field above mentioned to generate an electromagnetic force which serves to expand spring 24 and to contract spring 29 to move the armature coil upwardly in the magnetic field in FIG. 5. This movement of the armature coil generates therein a counter electromotive force of positive polarity. As the armature coil moves upwardly at a varying velocity, this electromotive force varies in magnitude correspondingly. This allows the armature coil current firstly to increase and secondly to decrease and thirdly to increase again in magnitude as shown in FIGS. 4A and B as later described until equilibrium is established between the generated electromagnetic force and the elastic force of the springs 24 and 29. At this time, transistors Q2, Q3 and Q1 are sequentially turned OFF because of the reduced base drive voltage supplied to transistor Q1. During this upward movement of the armature coil, it is apparent that the piston attached thereto is also correspondingly moved further upwardly in cylinder opening 48, i.e., the piston is displaced from a minimum insertion distance to a maximum insertion distance in the cylinder opening 48. At this moment, it can be said that the armature coil and the piston, including springs 24 and 29, are in a state of rest.

Now due to the energy stored in the compressed spring 29 and the expanded spring 24, the armature coil is activated downwardly in the magnetic field in FIG. 5 with increasing velocity whereby current in the armature coil is caused to decay to a zero value in the armature coil shown in FIGS. 4A and B and later explained. The armature coil thereupon generates therein an electromotive force having negative polarity and varying magnitude in response to: (1), initially, the electric energy stored in the armature coil, i.e., the inductive discharge of the armature coil, and then (2) the downward movement of the armature coil in the magnetic field as previously identified. This negative electromotive force is applied via the series network of capacitor C1-resistor R2 to the base of the second transistor Q2 which is thereby held turned OFF to hold the third and first transistors Q3 and Q1, respectively, turned OFF.

The generated electromotive force of negative polarity is maintained so long as the armature coil is moving in the downward direction in the magnetic field and until equilibrium is established between the generated electromagnetic force and the elastic force of the expanded spring 29 and compressed spring 24. During this downward movement of the armature coil, it is evident that the piston attached thereto is also correspondingly moved downwardly in cylinder opening 48, i.e., the piston is withdrawn from the maximum distance to the minimum distance in the latter opening. At this moment, it can be said that the armature coil and piston, including springs 24 and 29, are in a state of rest. The foregoing successive upward and downward movements of the armature coil and attached piston constitute one operating cycle of the electrodynamical oscillator in FIGS. 1 and 5 for compressing a refrigerant in a hand portable refrigerator. Additional operating cycles in FIGS. 1 and 5 are repeated in the same manner. It is thus seen that the frequency of the alternate turn ON and OFF of the group of transistors in the electric oscillator is synchronized with the natural frequency of the alternate compression and expansion of the springs in the mechanical oscillator included in the electrodynamical oscillator of FIGS. 1 and 5, i.e., with the respective upward and downward movements of the armature coil.

Turning now to FIGS. 4A and B, the foregoing operation of FIGS. 1 and 5 is further explained in the following manner. When the switch is closed, the source voltage is applied across the series connection of the collector-emitter junction of the first transistor Q1 and the armature coil at time A' to start current flow in the armature coil at time A. As the armature coil moves upwardly with increasing velocity, the correspondingly increasing magnitude of the generated counter electromotive force serves firstly, to increase the amount of current flow in the armature coil and secondly to reduce the amount of current flow in the armature coil until time B is attained whereat the maximum velocity of the armature coil occurs.

As the armature coil moves further upwardly beyond the time B, the velocity of the armature coil decreases to increase the amount of current flow in the armature coil until time C at which equilibrium is established between the generated electromagnetic force and the elasticity of the springs 24 and 29 to stop the upward movement of the armature coil. During time interval B – C, the decreasing velocity of the armature coil serves to decrease correspondingly the magnitude of the generated counter electromotive force, thereby permitting a corresponding increase in the amount of current flow in the armature coil to point C. This point indicates that when the collector current (IC) for transistor Q1 is equal to its gain multiplied by the base current ($hFE \times Ib$), the transistor Q1 comes out of the saturation mode to turn OFF. It is noted that the voltage applied across the armature coil due to source 10 remains constant during time interval A'–B' which is equal to the time interval A – C.

As the armature coil moves downwardly with increasing velocity, current in the armature coil decreases from amount C to zero amount D, while at the same time the generated counter electromotive force in the armature coil reverses from positive to a negative polarity. Further downward movement of the armature coil with increasing velocity results in zero current therein during time interval D – E while the magnitude of the generated counter electromotive force of negative polarity increases with the increasing velocity of the armature coil and decreases with decreasing velocity of the armature coil as illustrated in time interval C'– D'. It is thus apparent that the transistors Q1, Q2 and Q3 are turned OFF in the time interval C, D and E and further that at the respective times E and D' equilibrium is established between the generated electromagnetic force and the elasticity of the springs 24 and 29 to terminate the downward movement of the armature coil. Therefore, it is evident that one operating cycle of the electrodynamical oscillator takes place in the time interval A – E in FIG. 4A and in the corresponding time interval A' – D' in FIG. 4B. Additional operating cycles are repeated in the respective corresponding time intervals. Accordingly, the transistors Q1, Q2 and Q3 as a group are alternately turned ON and OFF in synchronism with the natural frequency of the alternately compressed and expanded springs, i.e., with the upward and downward movements of the armature coil.

DESCRIPTION OF ADDITIONAL EMBODIMENTS OF THE INVENTION

Figure 2:
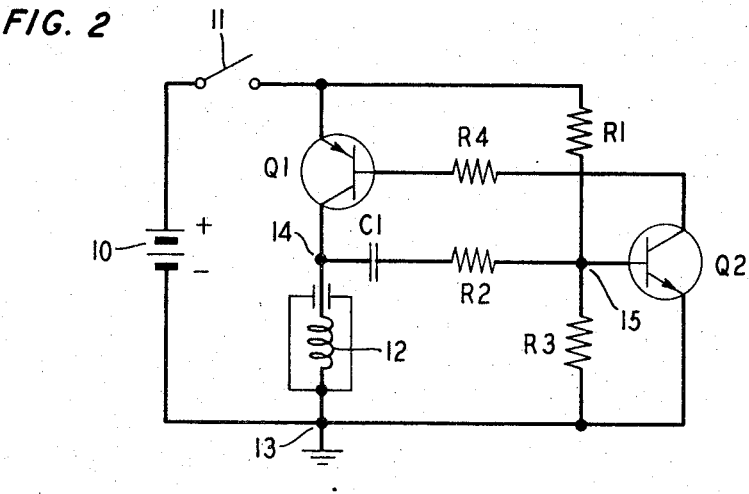
FIGS. 2 and 3 are schematic diagrams of other embodiments of the invention in FIG. 1.

FIG. 2 is similar to FIG. 1 except the power transistors Q1 and Q3 in FIG. 1 are replaced with single PNP transistor Q1 in FIG. 2. The transistors Q1 and Q3 constitute effectively a PNP power transistor in FIG. 1. Otherwise, the structure and operation in FIG. 2 are the same as those previously explained for FIG. 1 in relation to FIGS. 4A and B and 5.

Figure 3:
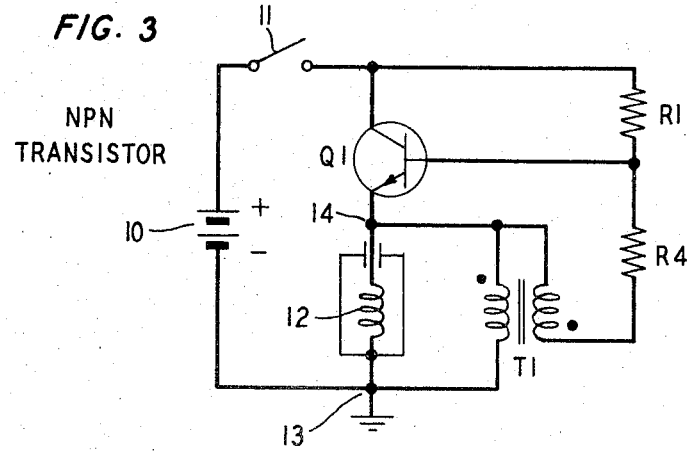

FIG. 3 is similar to FIGS. 1 and 2 in the respect of including an NPN transistor Q1 having its collector connected to the positive terminal of switch 11, and its collector-emitter junction to the common point 14. This point is also connected to one end of the armature coil whose opposite end is connected to ground 13 in the series circuit in FIGS. 1 and 5 as hereinbefore identified. FIG. 3 differs from FIGS. 1 and 2 by including transistor Q1 having its base coupled through resistor R1 to the switch 11, and a transformer T1 having its primary winding connected in parallel with the armature coil, and one end of its secondary winding connected to the common point 14 and the opposite end of the latter winding through resistor R4 to the base of transistor Q1.

In the operation of FIG. 3, closure of the switch provides positive forward bias from source 10 to the base of transistor Q1 to start a minimum flow of current in a circuit including the positive terminal of source 10, switch 11, the collector-emitter junction of transistor Q1, the armature coil and ground 13 in the series circuit in FIGS. 1 and 5 as previously described. The flow of current in the base-emitter junction of transistor Q1 increases the flow of current in the collector-emitter junction thereof. Due to such increased current flow in the armature coil a voltage is produced thereacross. However, this voltage is suppressed across the transformer primary winding. Because of transformer action a voltage induced in the transformer secondary winding starts current flow in a drive circuit including common point 14, the transformer secondary winding, resistor R4, and the base-emitter junction of transistor Q1. This causes a further increased amount of current flow through the collector-emitter junction of transistor Q1. This increased current due to regenerative feedback via the transformer secondary winding is continued until transistor Q1 is entirely turned ON. At this time, the full voltage of source 10, minus the voltage drop in transistor Q1, is applied across the armature coil to institute current flow therein in the series circuit essentially the same as that above traced in FIGS. 1 and 5. This current flow generates the electromagnetic force required to compress spring 29 and to expand spring 24 for moving the armature coil upwardly, for example, at an increasing velocity in the magnetic field in FIG. 5.

As the armature coil moves upwardly with varying velocity, the armature coil generates the counter electromotive force of positive polarity with correspondingly varying magnitude to vary the current flow in the armature coil as shown in FIGS. 4A and B and previously explained until equilibrium is established between the generated electromagnetic force and the elastic force of the springs 24 and 29. Obviously, as the armature coil moves upwardly it carries the piston with it. At this time, the collector current (IC) of transistor Q1 is equal to the gain multiplied by the base current ($hFE \times Ib$), whereby the transistor is caused to come out of saturation to turn OFF. At this moment the armature coil and the piston including the springs 24 and 29 are in a state of rest. This operation for the upward movement of the armature coil in FIG. 3 is similar to that for the upward movement of the armature coil in FIG. 1 as previously explained and as a consequence the appropriate curves in FIGS. 4A and B apply to such movement as hereinbefore noted.

Now, due to the energy stored in the compressed spring 29 and the expanded spring 24 the armature coil is activated downwardly in the magnetic field in FIG. 5 with increasing velocity whereby the inductive current in the armature coil decays until zero current value is attained. Thereupon, the armature coil generates the electromotive force of negative polarity in the manner of the armature coil in FIG. 1 as hereinbefore mentioned. This negative electromotive force effective across the transformer primary winding is applied via the transformer secondary winding and resistor R4 to the base-emitter junction of transistor Q1 to hold the latter transistor turned OFF. This negative electromotive force is generated so long as the armature coil is moving in the downward direction in the magnetic field until equilibrium is established between the generated electromagnetic force and the elastic force of the springs 24 and 29. Osviously, the downward movement of the armature coil serves to correspondingly move downwardly the attached piston in the cylinder 48. The operation for the downward movement of the armature coil in FIG. 3 is similar to that for the downward movement of the armature coil in FIG. 1, as previously explained, and as a consequence the pertinent curves in FIGS. 4A and B apply to the above described downward operation in FIG. 3. At this time, the armature coil and the piston, including the springs 24 and 29, are in a state of rest. These upward and downward movements of the armature coil and attached piston constitute one operating cycle in FIGS. 3 and 5. Additional operating cycles in FIGS. 3 and 5 are repeated in the same manner. It is thus seen that the alternate turn ON and OFF of the transistor Q1 in the electric oscillator in FIG. 3 is synchronized with the natural frequency of the alternate expansion and compression of the respective springs 24 and 29 in the mechanical oscillator included in the electrodynamical oscillator of FIG. 3, i.e., with the upward and downward movements of the armature coil.

Figure 7:
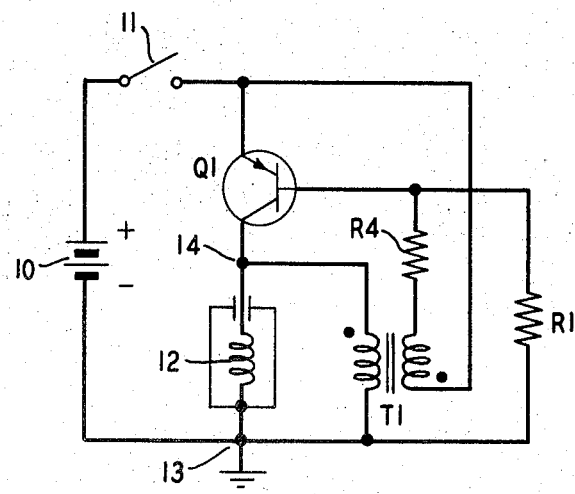
FIG. 7 is a schematic diagram of an additional embodiment of the invention in FIG. 1.

FIG. 7 is similar to FIG. 3 except the former contains a PNP transistor Q1 replacing the NPN transistor Q1 in FIG. 3 and having its emitter connected to the positive terminal of switch 11 and its emitter-collector junction to the common point 14. Also, FIG. 7 includes the switch positive terminal connected through the secondary winding of transformer T1 and resistor R4 in series to the base of the transistor. This base is further connected via resistor R1 to ground 13 which includes one end of the transformer primary winding. It is understood that the oscillator shown in FIG. 7 operates essentially in the manner of that hereinbefore described regarding the oscillator in FIG. 3.

Figure 6:
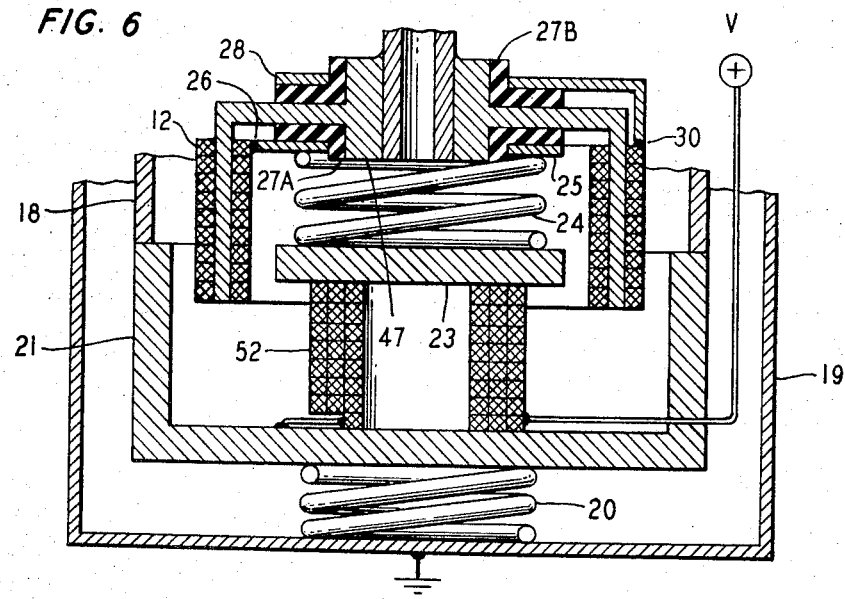
FIG. 6 is a partial cross section of a refrigerant compressor embodying an electromagnetic oscillator usable with the invention in each of FIGS. 1, 2, 3 and 7.

FIG. 6 delineates an electromagnetic oscillator which is similar to the electrodynamical oscillator in FIGS. 1, 2, 3, 5 and 7 except an electromagnet 52 in FIG. 6 replaces the permanent magnet 22 in FIG. 5. Otherwise, the operation of FIG. 6 as embodied in any one of FIGS. 1, 2, 3 and 7 is essentially the same as that hereinbefore explained with reference to FIGS. 1, 4A and B, and 5.

It is understood that the several embodiments of the invention as disclosed herein serve to provide an explanation thereof as used with a hand portable refrigerator. Other modifications may occur to those skilled in the art without departing from the spirit and scope of the invention. It is further understood that the invention is to be limited by the scope of the appended claims.

What is claimed is:

1. An electro-mechanical oscillator, comprising:
  a mechanical oscillator including an armature coil mounted between two resonant springs to oscillate at a natural frequency of said springs in response to alternate expansion and compression thereof;
  an electric oscillator consisting of:
    at least one transistor connected in circuit with said coil and turned ON by an initial voltage of positive polarity to institute a flow of current in said coil for expanding one of said springs and compressing the other to move said coil in one direction to generate therein a counter voltage of positive polarity which varies the amount of current flow in said coil until said one and other springs terminate said coil one direction movement to turn OFF said one transistor, and thereafter said one and other springs compressing and expanding, respectively, to move said coil in an opposite direction to generate in said coil a further voltage of negative polarity until said last-mentioned one and other springs terminate said coil opposite direction movement; and
  circuit means for initially supplying a voltage of positive polarity to activate said one transistor to hold said one transistor ON as said coil is moved in said one direction and thereafter supplying said further voltage of negative polarity to activate said transistor to hold said transistor OFF as said coil is moved in said opposite direction;
  whereby said transistor is turned ON and OFF in synchronism with said coil one and opposite direction movements, respectively, in response to said alternate expansion and compression of said one and other springs.

2. The oscillator according to claim 1 in which said one transistor includes a collector, an emitter and a base of which a junction of said collector and emitter is connected in circuit with said coil; and said circuit means includes a capacitor-resistor network coupling a common point of said collector and emitter junction and said coil to said base.

3. The oscillator according to claim 1 in which said transistor includes a collector, an emitter and a base of which a junction of said collector and emitter is connected in said circuit with said coil; and said circuit means includes a transformer having a primary winding connected in parallel with said coil and a secondary winding coupling said primary winding to said base.

4. The oscillator according to claim 1 which includes:
a source of direct voltage providing said initial voltage and having positive and ground terminals; and
second and third transistors; each of said first-mentioned, second and third transistors having a collector, an emitter and a base;
said first-mentioned transistor having its collector connected to said source positive terminal and its emitter to one end of said coil which has its opposite end connected to said source ground terminal; said second transistor having its base connected to said source positive terminal and its emitter connected to said ground terminal; and said third transistor having its base connected to said second transistor collector, its emitter to said source positive terminal and its collector to said first-mentioned transistor base; and
said circuit means including a capacitor-resistor network connecting a common point of said first-mentioned transistor emitter and said coil one end to said second transistor base.

5. The oscillator according to claim 1 which includes;
a source of direct voltage providing said initial voltage and having positive and ground terminals; and
a second transistor; each of said first-mentioned and second transistors having a collector, an emitter and a base; said first-mentioned transistor having its emitter connected to said source positive terminal and its collector to one end of said coil which has its opposite end connected to said source ground terminal; said second transistor having its base connected to said source positive terminal, its emitter to said source ground terminal and its collector to said first-mentioned transistor base; and
said circuit means comprising a capacitor-resistor network connecting a common point of said first-mentioned transistor collector and said coil one end to said second transistor base.

6. The oscillator according to claim 1 which includes:
a source of direct voltage providing said initial voltage and having positive and ground terminals;
said transistor having a collector connected to said source positive terminal, a base coupled through a first resistor to said source positive terminal, and an emitter connected to one end of said coil which has its opposite end connected to said source ground terminal; and
said circuit means includes a transformer having a primary winding connected across said coil one and opposite ends and coupled to said coil, and a secondary winding having one end connected to a point common to said emitter, said coil one end and one end of said primary winding; said secondary winding also having an opposite end connected through a second resistor to said transistor base.

7. The oscillator according to claim 1 which includes:
a source of direct voltage providing said initial voltage and having positive and negative terminals;
said transistor having an emitter connected to said source positive terminal, a base coupled through a first resistor to said source ground terminal, and a collector connected to one end of said coil which has its opposite end connected to said source ground terminal; and
said circuit means includes a transformer having a primary winding connected across said coil one and opposite ends and coupled to said coil, and a secondary winding having one end connected to said source positive terminal and an opposite end coupled through a second resistor to said base.

8. An electro-mechanical oscillator, comprising:
a mechanical oscillator including an armature coil mounted between two resonant springs to oscillate at a natural frequency of said springs in response to alternate expansion and compression thereof; and
an electric oscillator including:
a source of direct voltage having positive and ground terminals;
first, second and third transistors, each having a collector, an emitter and a base; said first transistor having its collector connected to said source positive terminal and its emitter to one end of said coil which has its opposite end connected to said source ground terminal; said second transistor having its base coupled through a first resistor to said source positive terminal and its emitter connected to said source ground terminal; said third transistor having its emitter connected to said source positive terminal; its base coupled through a second resistor to said second transistor collector and its collector connected to said first transistor base; said second, third and first transistors turned ON in turn in response to said source positive voltage for enabling a junction of said first transistor collector and emitter to supply source direct current to said coil for expanding one of said springs and compressing the other to move said coil in one direction to generate therein a counter voltage of positive polarity which varies the amount of current flow in said coil until said one and other springs terminate said coil one direction movement to turn OFF said second, third and first transistors in sequence and thereafter said one and other springs compressing and expanding, respectively, to move said coil in an opposite direction to generate in said coil a further voltage of negative polarity until said last-mentioned one and other springs terminate said coil opposite direction movement; and
a capacitor-resistor network connecting a common point of said first transistor emitter and said coil one end to said second transistor base for supplying voltage of positive polarity to said second transistor base to hold said second, third and first transistors turned ON during said coil one direction movement and thereafter for supplying said further voltage of negative polarity to said second transistor base to hold said second, third and first transistors turned OFF during said coil opposite direction movement;
whereby said first, second and third transistors are turned ON and OFF in synchronism with the natural frequency of said alternate expansion and compression of said one and other springs and with said respective one and opposite direction movements of said coil.

9. An electro-mechanical oscillator, comprising:
a mechanical oscillator including an armature coil mounted between two resonant springs to oscillate at a natural frequency of said springs in response to alternate expansion and compression thereof; and
an electric oscillator including:
  a source of direct voltage having positive and ground terminals;
  first and second transistors, each having a collector, an emitter and a base; said first transistor having its emitter connected to said source positive terminal and its collector to one end of said coil which has its opposite end connected to said source ground terminal; said second transistor having its base coupled through a first resistor to said source positive terminal, its emitter to said source ground terminal, and its collector coupled through a second resistor to said first transistor base;
  said second and first transistors turned ON in turn in response to said source positive potential for enabling an emitter-collector junction of said first transistor to supply source direct current to said coil for expanding one of said springs and compressing the other to move said coil in one direction to generate therein a counter voltage of positive polarity which varies the amount of current flow in said coil until said one and other springs terminate said coil one direction movement to turn OFF said second and first transistors in sequence, and thereafter said one and other springs compressing and expanding, respectively, to move said coil in an opposite direction to generate in said coil a further voltage of negative polarity until said last-mentioned one and other springs terminate said coil opposite direction movement; and
  a capacitor-resistor network connecting a common point of said first transistor collector and said coil one end to said second transistor base for supplying a voltage of positive polarity to said second transistor base to hold said second and first transistors turned ON during said coil one direction movement and thereafter for supplying said further voltage of negative polarity to said second transistor base to hold said second and first transistors turned OFF during said coil opposite direction movement;
whereby said first and second transistors are turned ON and OFF in synchronism with the natural frequency of said alternate expansion and compression of said one and other springs and with respective one and opposite direction movements of said coil.

10. An electro-mechanical oscillator, comprising:
a mechanical oscillator including an armature coil mounted between two resonant springs to oscillate at a natural frequency of said springs in response to alternate expansion and compression thereof; and
an electric oscillator including:
  a source of direct voltage having positive and ground terminals;
  a transistor having a collector connected to said source positive terminal, an emitter connected to one end of said coil which has its opposite end connected to said source ground terminal, and a base coupled through a first resistor to said source positive terminal;
  said transistor turned ON in response to said source positive voltage for enabling a junction of said collector and said emitter to supply direct current from said source to said coil to expand one of said springs and to compress the other to move said coil in one direction to generate in said coil a counter voltage of positive polarity which varies the amount of current flow in said coil until said one and other springs terminate said coil one direction movement to turn OFF said transistor, and thereafter said one and other springs contracting and expanding, respectively, to move said coil in an opposite direction to generate in said coil a further voltage of negative polarity until said last-mentioned one and other springs terminate said coil opposite direction movement; and
  a transformer having a primary winding connected across said coil one and opposite ends and coupled to said coil, and a secondary winding having one end connected to a point common to said emitter, said coil one end and one end of said primary winding; said secondary winding having an opposite end connected through a second resistor to said base; said secondary winding applying a voltage of positive polarity to said base to hold said transistor turned ON during said coil one direction movement and thereafter applying said further voltage of negative polarity to said base to hold said transistor turned OFF during said coil opposite direction movement;
whereby said transistor is turned ON and OFF in synchronism with the natural frequency of said alternate expansion and compression of said one and other springs and with said respective one and opposite direction movements of said coil.

11. An electro-mechanical oscillator comprising:
a mechanical oscillator including an armature coil mounted between two resonant springs to oscillate at a natural frequency of said springs in response to alternate expansion and compression thereof; and
an electric oscillator including:
  a source of direct voltage having positive and ground terminals;
  a transistor having an emitter connected to said source positive terminal, a collector connected to one end of said coil which has its opposite end connected to said source ground terminal, and a base connected through a first resistor to said source ground terminal;
  said transistor turned ON in response to said source positive voltage for enabling a junction of said emitter and said collector to supply direct current from said source to said coil to expand one of said springs and to compress the other to move said coil in one direction to generate therein a counter voltage of positive polarity which varies the amount of current flow in said coil until said one and other springs terminate said coil one direction movement to turn OFF said transistor, and thereafter said one and other springs contracting and expanding, respectively, to move said coil in an opposite direction to generate therein a further voltage of negative polarity until said last-mentioned one and other springs terminate said coil opposite direction movement; and a transformer having a primary winding connected across said coil one and opposite ends and coupled to said coil, and a secondary winding having one end connected to said source positive terminal and an opposite end connected through a second resistor to said base; said secondary winding applying a voltage of positive polarity to said base to hold said transistor turned ON during said coil one direction movement and thereafter applying said further voltage of negative polarity to said base to hold said transistor turned OFF during said coil opposite direction movement;

whereby said transistor is turned ON and OFF in synchronism with the natural frequency of said alternate expansion and compression of said one and other springs and with said respective one and opposite movements of said coil.

* * * * *